United States Patent
Shani et al.

(10) Patent No.: US 10,289,406 B2
(45) Date of Patent: May 14, 2019

(54) DEPENDENCIES BETWEEN FEATURE FLAGS

(71) Applicant: HEWLETT-PACKARD DEVELOPMENT COMPANY, L.P., Houston, TX (US)

(72) Inventors: Inbar Shani, Yehud (IL); Sharon Lin, Yehud (IL); Yael Oshri, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 303 days.

(21) Appl. No.: 14/783,477

(22) PCT Filed: Apr. 30, 2013

(86) PCT No.: PCT/US2013/038738
§ 371 (c)(1),
(2) Date: Oct. 9, 2015

(87) PCT Pub. No.: WO2014/178829
PCT Pub. Date: Nov. 6, 2014

(65) Prior Publication Data
US 2016/0063282 A1 Mar. 3, 2016

(51) Int. Cl.
*G06F 8/60* (2018.01)
*G06F 8/70* (2018.01)
*G06F 8/71* (2018.01)
*G06F 9/38* (2018.01)
*G06F 21/71* (2013.01)

(52) U.S. Cl.
CPC .................. *G06F 8/70* (2013.01); *G06F 8/60* (2013.01); *G06F 8/71* (2013.01); *G06F 9/38* (2013.01); *G06F 21/71* (2013.01)

(58) Field of Classification Search
CPC ..... G06F 8/60; G06F 8/70; G06F 8/71; G06F 9/06; G06F 9/38; G06F 21/71
USPC .................................................. 717/120–123
See application file for complete search history.

(56) References Cited

U.S. PATENT DOCUMENTS

| | | |
|---|---|---|
| 6,829,699 B2 | 12/2004 | Leenstra et al. |
| 7,822,948 B2 | 10/2010 | Lewis |
| 8,006,229 B2 | 8/2011 | Shinomi |
| 2002/0062463 A1* | 5/2002 | Hines ........................ G06F 8/36 714/38.14 |
| 2007/0039054 A1* | 2/2007 | Mulla ..................... G06F 21/73 726/26 |
| 2007/0162903 A1* | 7/2007 | Babb, II ................... G06F 8/75 717/154 |

(Continued)

OTHER PUBLICATIONS

Fowler, Martin, "FeatureToggle," <http://martinfowler.com/bliki/FeatureToggle.html>, Oct. 29, 2010, p. 1-4.*

(Continued)

*Primary Examiner* — Qing Chen

(57) ABSTRACT

An example method for handling dependencies between feature flags can include defining, by a processing resource executing instructions, dependencies between a plurality of feature flags in a process executable by the processing resource. The method can include enforcing, by the processing resource executing instructions, the dependencies during activation of a first feature by a determination of validity of utilization of a feature flag as a switch for a second feature.

19 Claims, 4 Drawing Sheets

(56) References Cited

U.S. PATENT DOCUMENTS

| | | | |
|---|---|---|---|
| 2008/0127087 A1* | 5/2008 | Brookins | G06F 8/71 717/121 |
| 2009/0049438 A1 | 2/2009 | Draper et al. | |
| 2009/0240649 A1* | 9/2009 | Sereni | G06F 17/30451 706/54 |
| 2010/0325602 A1 | 12/2010 | Kraft et al. | |

OTHER PUBLICATIONS

Harel, Eran, "Feature Flags Made Easy," <http://techblog.outbrain.com/tag/feature-flags/>, Jul. 5, 2011, p. 1-4.*

Harmes, Ross, "Flipping Out," <http://code.flickr.net/2009/12/02/flipping-out/>, Dec. 2, 2009, p. 1-3.*

Hammond, J.S. et al., Five Ways to Streamline Release Management, Feb. 7, 2011, <http://www.serena.com/docs/repository/solutions/Forrester-Five_Ways_to_Streamline_Release_ Management-from_Serena_Software.pdf>, 23 pages.

International Search Report and Written Opinion, dated Jan. 13, 2014, PCT Patent Application No. PCT/US2013/038738, 10 pages.

McNie, N., The Why and How of Continuous Delivery, Retrieved from the Internet: <http://stuff.nigel.mcnie.name/The_Why_And_How_Of_Continuous_Delivery.pdf> [retrieved on Feb. 14, 2013], 22 pages.

Needham, M., Web Operations: Feature Flags to Turn Off Failing Parts of Infrastructure, Nov. 13, 2012, <http://www.markhneedham.com/blog/2012/11/13/web-operations-feature-flags-to-turn-off-failing-parts-of-infrastructure/>, 4 pages.

Shani, et al., "Global Feature Library Useable with Continuous Delivery", PCT Application No. PCt/US2012/053212, Filed Aug. 30, 2012, 25 pages.

Unknown, SyncNorwich Testing at Google Scale, Oct. 22, 2102, Retrieved from the Internet: <http://smart421.wordpress.com/tag/agile-software-automated-build-dependency-management/> [retrieved on Feb. 14, 2014], 5 pages.

Extended European Search Report received in EP Application No. 13883506.1, dated Nov. 10, 2016 9 pages.

Köbler, N., "Continuous Delivery mit dem FeatureToggle Pattern," (Research Paper), Mar. 19, 2013, 4 pages, available at https://www.heise.de/developer/artikel/Continuous-Delivery-mit-dem-FeatureToggle-Pattern-1825477.html?view=print.

* cited by examiner

DEPENDENCIES BETWEEN FEATURE FLAGS

CROSS-REFERENCE TO RELATED APPLICATION

This application is a U.S. National Stage Application of and claims priority to International Patent Application No. PCT/US2013/0038738, filed on Apr. 30, 2013, and entitled "DEPENDENCIES BETWEEN FEATURE FLAGS".

BACKGROUND

Continuous Delivery (CD) is a growing practice of a lifecycle of software development. CD may contribute to automating a code delivery pipeline, for instance, from a build and unit test stage (e.g., Continuous Integration (CI)) to deploying a number of software implementations into an environment and executing an application programming interface (API), to functional and performance testing. In some instances, CD can deploy the software implementations into a production environment when the testing has been successfully completed.

DETAILED DESCRIPTION

Figure 1:
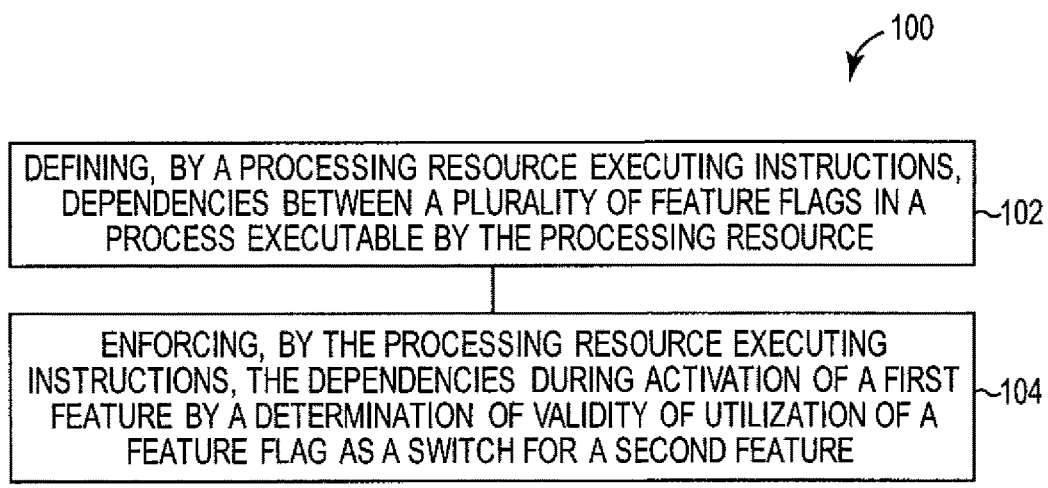
FIG. 1 depicts a block diagram of an example method for handling dependencies between feature flags according to the present disclosure.

Practitioners of CD and/or CI may develop large portions of the instruction code on a main trunk without branching of a code repository (e.g., a source configuration management (SCM) repository). This practice may reduce code mergers and may result in code being "in production" throughout development and/or implementation, considerations that developers can take into account.

Utilization of feature flags (e.g., feature flips, feature switches, among other terms) is increasing in CD and/or CI. Practitioners of CD and/or CI can utilize feature flags as switches to specifically and dynamically activate and deactivate (e.g., turn on and off) associated features of a process executable by a processing resource, thereby, for instance, reducing risk of possibly causing malfunction of the process by allowing delivery and/or integration of feature code continuously.

For example, a feature (e.g., an intentionally distinguishing characteristic of a software item and/or code, especially in functionality, with respect to other software items and/or code) may not be an atomic and/or independent software item and/or code. That is, in many instances, functionality of one or more features can be dependent on activation or inactivation of one or more other features. For example, a second feature may deliver a "search term completion" function inside a "search" function and a first feature may deliver the "search" function on a graphic user interface (GUI). In such a scenario, if a developer, for example, activates the second feature without turning on the first feature as well, the process (e.g., software application) may be placed in a state where the "search term completion" function is active but the actual "search" function is inactive, possibly causing malfunction of the process (e.g., resulting in errors and/or performance degradation in runtime).

Feature flags can work by encompassing code in a logical "if then" clause, where the "if" statement can check a variable to see if the feature should be active or not. The code within the clause can be a primary (and possibly the only) code path to activate the feature (e.g., a GUI that users can utilize to access the feature, among many other possibilities). For instance, when a variable is set to "false", the code may be inaccessible such that the feature is not rendered to the users through the GUI, the feature therefore being "hidden". Another example is when the clause is surrounding an API definition, thereby "hiding" it from being called by other applications (e.g., in the case of Representational State Transfer (REST) services, among other possibilities).

Another option is to activate or inactivate the feature flag (e.g., turn the feature flag on or off) based on whether a condition is satisfied. As one example, such a condition can be whether a property of a user is satisfied, such as turning the feature on via the feature flag for users with administrative rights but not for read-only users. Another example is to turn the feature on via the feature flag for a portion of the users (e.g., 10%) in a given time span (e.g., 2 days), which may, for instance, be done to prevent overuse of certain portions of the process, computing resources, etc. Another example is with A/B testing (e.g., split testing) using a sample size of real users.

Handling dependencies between feature flags, as described in the present disclosure, can include defining, by a processing resource executing instructions (e.g., the instructions stored on a non-transitory medium), the dependencies between a plurality of feature flags in a process executable by the processing resource. The method can include enforcing, by the processing resource executing instructions, the dependencies during activation of a first feature by a determination of validity of utilization of a feature flag as a switch for a second feature, as described herein. As used herein, "a", "at least one", or "a number of" an element (e.g., feature flag and/or feature, among other elements herein) can refer to one or more of such elements. Further, where appropriate, as used herein, "for example" and "by way of example" should be understood as abbreviations for "by way of example and not by way of limitation".

FIG. 1 depicts a block diagram of an example method for handling dependencies between feature flags according to the present disclosure. Unless explicitly stated, the method examples described herein are not constrained to a particular order or sequence. Additionally, some of the described method examples, or elements thereof, can be performed at the same, or substantially the same, point in time. As described herein, the actions, functions, calculations, data manipulations and/or storage, etc., can be performed by execution of non-transitory machine readable instructions stored in a number of memories (e.g., software, firmware, and/or hardware, etc.) of a number of applications. As such, a number of computing resources with a number of interfaces (e.g., GUIs) can be utilized for handling dependencies between feature flags (e.g., via accessing a number of computing resources via the GUIs).

The present disclosure describes a method 100 for handling dependencies between feature flags that utilizes a processing resource to execute instructions stored on a non-transitory medium. The method can include, as shown in block 102 of FIG. 1, defining, by a processing resource executing instructions, dependencies between a plurality of feature flags in a process executable by the processing resource. The process can be, for example, a software application encoded with program instructions (e.g., code) to be executable by a processor to perform the process. The encoded program instructions can, in various examples, be stored on a portable medium (e.g., a compact disk, a digital versatile disk, a flash drive, among others) and/or on a server (e.g., in memory) from which the encoded program instructions can be downloaded and installed. In some examples, the encoded program instructions can be included in an application or applications installed on the server. In some examples, the application or applications can be stored on integrated memory (e.g., a hard drive) of the server.

In various examples, such encoded program instructions can be downloaded (e.g., via CD, as described herein) and/or integrated (e.g., via CI, as described herein) during creation and/or development of the process prior to release to consumers. Alternatively or in addition, such encoded program instructions can be downloaded and/or provided to consumers for update of processes executable on personal computing devices (e.g., a personal computer, a portable telephone, such as a cell phone, a smartphone, etc., a personal digital assistant, etc).

In some examples of the present disclosure, the method 100 can include, as shown in block 104 of FIG. 1, enforcing, by the processing resource executing instructions, the dependencies during activation of a first feature by a determination of validity of utilization of a feature flag as a switch for a second feature, as described herein. Developers, for example, may reduce a possibility of causing malfunction of the process by defining dependencies between feature flags so that when a particular feature is to be activated or inactivated, the dependencies from that particular feature flag and other feature flags that that particular feature flag is dependent-on will be considered. Accordingly, such activations and/or inactivations via the feature flags can be made allowable or not allowable dependent on a determination of the validity (e.g., logicality) in terms of the process flow.

Defining the dependencies between the feature flags automatically (e.g., by a programmed flag definitions functionality, as described herein) can improve the performance (e.g., speed, accuracy, etc.) because, for instance, developers of a particular feature may not have easy access to the defined feature flags and/or their respective dependencies of a process, thereby making it difficult to decide the dependencies that should be defined for the feature flag of the particular feature. As such, the present disclosure includes, for example, defining and enforcing the dependencies in association with either of continuous delivery and/or continuous integration of code for the process.

Accordingly, the present disclosure describes determining dependencies between the first feature flag and the second feature flag to reduce a probability that the activation of the first feature results in a reduction of process functionality. The reduction in process functionality (e.g., an error and/or degradation in runtime performance) can, for example, be due to the second feature flag being either of dependent from the first feature flag (e.g., a second feature flag not being activated despite the activation of the first feature flag). The probability can also be reduced that the activation of the first feature results in a reduction of process functionality due to the first feature flag being dependent-on the second feature flag (e.g., an activated first feature flag depending from a second feature flag that is not activated).

Defining the dependencies between feature flags can result in defining a cyclic dependency between the plurality of feature flags. Defining such a cyclic dependency can prompt activating a notification that results in either of removing at least one dependency (e.g., changing a structure of a process flow) that causes the cyclic dependency and/or applying a consolidated feature flag to the plurality of feature flags of the cyclic dependency (e.g., to enable consolidated switching of the plurality of feature flags). In various examples, the notification can be to a user, a developer, and/or a client and/or a dedicated programmed functionality, as described herein, and instructions for removing the cyclic dependency and/or applying the consolidated flag feature can be initiated by and/or executed by one or more of the user, the developer, and/or the client and/or the dedicated programmed functionality (e.g., via execution of instructions by the processing resource). If the cyclic dependency is subsequently resolved (e.g., by removing at least one dependency), the feature flags can be switched (e.g., activated and inactivated) individually instead of as a consolidated feature flag.

In some examples, the dependencies can be presented on a GUI (e.g., in a feature management console). In various examples, the dependencies can be enforced through the GUI (e.g., as initiated by user, developer, and/or client input and/or automatically through execution of programmed instructions by the processing resource). For example, a flag definition functionality, as described herein, can be used to define the dependencies between the feature flags, enabling the dependencies to be enforced when activating or inactivating features (e.g., in the feature management console and/or in runtime).

Figure 2:
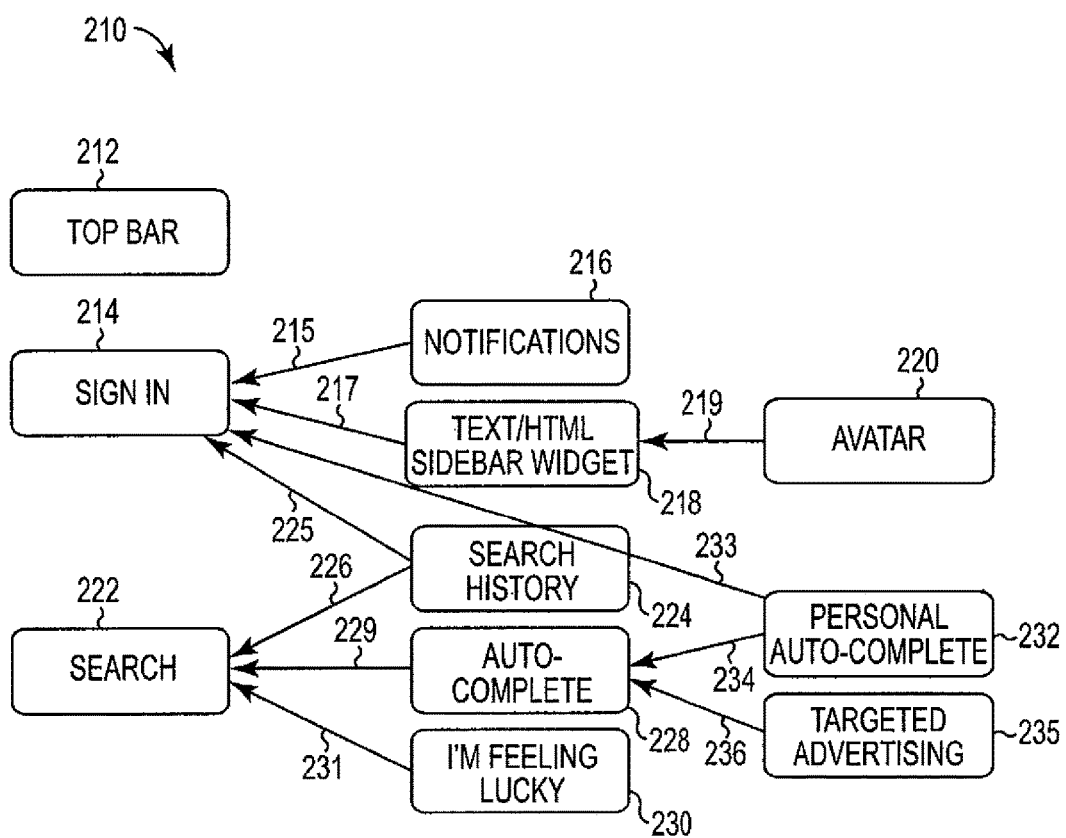
FIG. 2 illustrates a block diagram of an example feature flag graph according to the present disclosure.

FIG. 2 illustrates a block diagram of an example feature flag graph according to the present disclosure. The feature flag graph 210 shown in FIG. 2 illustrates, by way of example and not by way of limitation, a number of feature flags that can be included among those for features of a home page of a browser (e.g., visualizable on a GUI). Each of the individual feature flags can be termed a "vertex" in the flag graph 210 and each of the individual dependencies can be termed an "edge". The edges, as illustrated, are code paths each represented as a line with an arrowhead pointing toward a vertex that the other vertex is dependent-on, each of which can be termed a "directed edge".

The feature flag graph 210 can, for example, have a top bar 212 vertex representing a top bar of the home page. In some examples, the top bar 212 vertex can have no dependencies, indicated by no edges pointing toward or away from the top bar 212 vertex. The feature flag graph 210 also can, for example, have a sign-in 214 vertex representing a sign-in functionality of the home page. A notifications vertex 216 can be shown by an edge 215 to be dependent from the sign-in 214 vertex such that functionality of the notifications vertex 216 is dependent on activation of the feature flag of the sign-in 214 vertex. In addition, in some examples, a text/html sidebar widget 218 vertex can be shown by an edge 217 to be dependent from the sign-in 214 vertex such that functionality of the text/html sidebar widget 218 vertex is also dependent on activation of the feature flag of the sign-in 214 vertex. In some examples, an avatar 220 vertex can be shown by an edge 219 to be dependent from the text/html sidebar widget 218 vertex such that functionality of the avatar 220 vertex is dependent on activation of both the feature flag of the sign-in 214 vertex and the feature flag of the text/html sidebar widget 218 vertex.

The feature flag graph 210 can, in some examples, have a search 222 vertex representing a search function of the home page. In some examples, the search 222 vertex can have a number of dependencies, indicated by edges pointing toward or away from the search 222 vertex. For example, the search 222 vertex can have a search history 224 vertex that is shown by an edge 226 to be dependent from the search 222 vertex and that is also shown by an edge 225 to be dependent from the sign-in 214 vertex. The search 222 vertex also can, for example, have a dependent auto-complete 228 vertex (e.g., for auto-completion of search terms, etc.) with edge 229 and a dependent "I'm feeling lucky" 230 vertex (e.g., to introduce randomness into searches) with edge 231. Moreover, the feature flag graph 210 can, in some examples, include a personal auto-complete 232 vertex (e.g., for completion of search terms that are personalized to a user) and also can include a targeted advertising 235 vertex (e.g., implemented by the home page as being personalized to the user) that are shown to be dependent from the auto-complete 228 vertex by edges 234 and 236, respectively.

In some examples, each of the personal auto-complete 232 vertex and the targeted advertising 235 vertex can be shown by edges 234 and 236, respectively, to be dependent from the auto-complete 228 vertex such that functionality of each of the personal auto-complete 232 and the targeted advertising 235 vertices is dependent on activation of both the feature flag of the search 222 vertex and the feature flag of the auto-complete 228 vertex.

Accordingly, a non-transitory machine readable medium (MRM) storing a set of instructions can, when executed, cause a processing resource to define, in a feature flags graph (e.g., 210), dependencies between a plurality of feature flags in a process executable by the processing resource, determine operability (functionality) of the process via the feature flags graph when the process utilizes a first feature flag as a switch, and determine, based upon the dependencies in the feature flags graph, whether the first feature flag is utilizable as the switch. That is, in various examples, the feature flags graph can include the plurality of feature flags as vertices and the dependencies between the plurality of feature flags as a number of edges (e.g., directed edges connecting the first feature flag with a number of other feature flags dependent from the first feature flag and/or that the first feature flag is dependent-on).

The instructions, when executed, can cause the processing resource to determine, when the first feature flag is to be activated, validity of a change in feature flag status based upon a determination of dependent and dependent-on vertices by traverse from a vertex corresponding to the first feature flag. The validity of the change (e.g., activation) can be determined by whether the dependent and dependent-on vertices (e.g., some or each of the vertices) have feature flags that are activated. In some examples, the instructions can, when executed, cause a processing resource (e.g., through the feature management console by user, developer, and/or client input and/or automatically through execution of instructions by the processing resource) to enable at least one of the feature flags to be activated when it is previously inactivated (e.g., switched off), or vice versa.

By comparison, the instructions, when executed, can cause the processing resource to determine, when the first feature flag is to be inactivated, validity of a change in feature flag status based upon a determination of dependent and dependent-on vertices by traverse from a vertex corresponding to the first feature flag. The validity of the change (e.g., inactivation) can be determined by whether the dependent and dependent-on vertices (e.g., some or each of the vertices) have feature flags that are inactivated. In some examples, the instructions can, when executed, cause a processing resource (e.g., through the feature management console by user, developer, and/or client input and/or automatically through execution of instructions by the processing resource) to enable at least one of the feature flags to be inactivated when it is previously activated.

In various examples, the instructions, when executed, can cause a processing resource to determine whether an edge is traversable based upon satisfaction of at least one input condition, where the at least one input condition can be selected from a set that includes, for example, environment conditions and user conditions. Among various examples, the input conditions for traversability can include a condition (e.g., rule) that the traversability is active conditioned upon a given locale (e.g., a set of one or more conditions that define a language, region, country, date-time format setting, number format setting, etc.) being identified, being in a specified deployment environment (e.g., a hardware and/or software infrastructure in which an application code is deployed for execution), among other such conditions. For example, when traversing a feature flags graph, the set of input conditions can be used as conditions to evaluate whether edges can be traversed. When the conditions are satisfied (e.g., at least one of the conditions, all of the conditions, etc., being satisfied), the edge will be considered as active and will be traversed. In contrast, when the conditions are not satisfied, the edge will be considered as inactive and will not be traversed. This mechanism enables different flag dependency results premised upon environment and/or user conditions (e.g., locale, deployment environment, user input, among other conditions).

Figure 3:
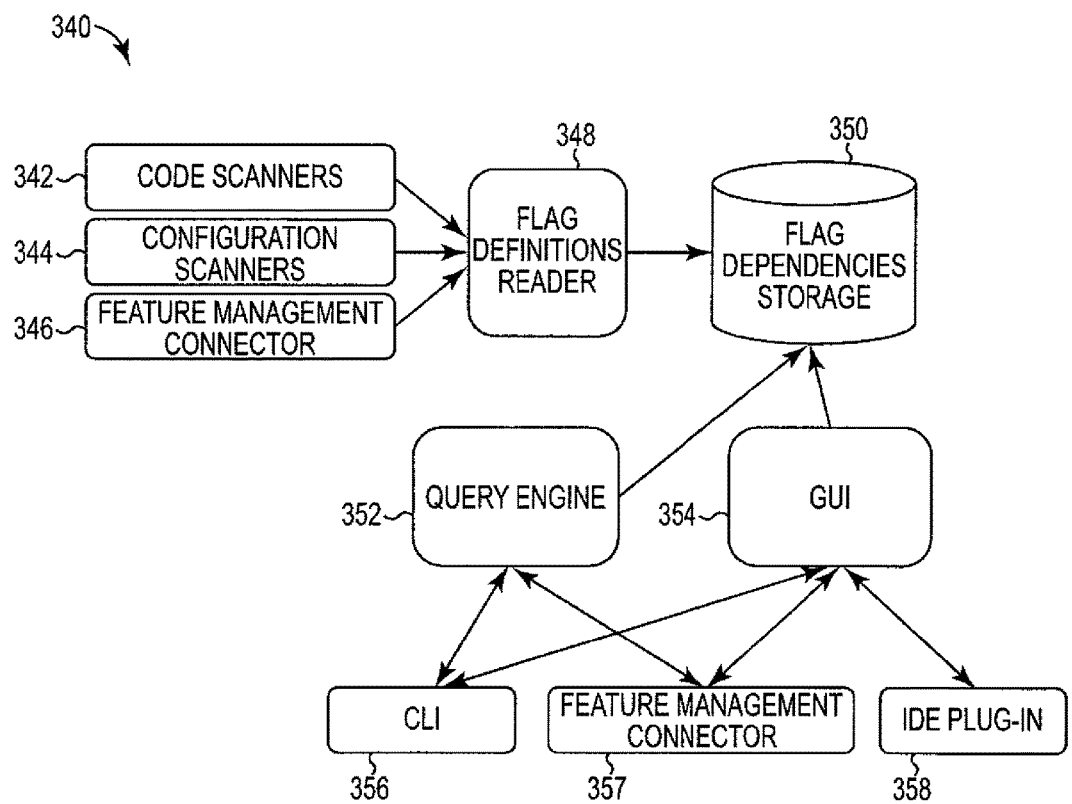
FIG. 3 illustrates a block diagram of an example system for handling dependencies between feature flags according to the present disclosure.

FIG. 3 illustrates a block diagram of an example system for handling dependencies between feature flags according to the present disclosure. A feature flags dependency functionality, as described herein, can be implemented as a standalone tool or within preinstalled feature flags management systems or as an add-on (e.g., a plug-in) to a developer's integrated development environment (IDE). The feature flags dependency functionality also can vary implementation of dependencies definitions to accommodate many different technologies (e.g., based upon deployment environments, etc.).

The example of the system 340 for handling dependencies between feature flags illustrated in FIG. 3 can integrate with encoded program instructions (e.g., feature flag code, etc.) by, for example, a number of code scanners 342, configurations code scanners 344, and/or a feature management connector 346 (e.g., integrated with a feature management console, as described herein). In various examples, the code scanners 342, configurations code scanners 344, and/or a feature management connector 346 can be operatively coupled to provide input to a flag definitions reader 348 (e.g., processor) that automatically defines (e.g., is programmed to define, as described herein) dependencies between the feature flags. In some examples, the flag definitions reader 348 can structure the flag definitions as one or more feature flag graphs, as described herein. The flag definitions reader 348 can input the feature flag dependencies to flag definitions storage 350 (e.g., memory, as described herein).

In various examples, the flag definitions storage 350 can be accessed through a query engine 352 and/or a GUI 354 to operatively enable dependencies between the feature flags (e.g., based upon the feature flag graphs, as described herein). The query engine 352 and/or the GUI 354 can, in various examples, be accessed by and/or provide feature flag dependency information to a command-line interface 356 (CLI) as a means of interaction with the flag definitions storage 350 and/or coded instructions. For example, a user, developer, and/or client can issue commands as successive lines of text (e.g., command lines). Similarly, the query engine 352 and/or the GUI 354 can, in various examples, be accessed by and/or provide feature flag dependency information to a feature management connector 357 (e.g., which can be the same as or different from feature management connector 346). Moreover, as described herein, the GUI 354 can, in various examples, be accessed by and/or provide feature flag dependency information to an IDE plug-in 358.

Accordingly, the system 340 may include a processing resource (e.g., a number of processors) in communication with a memory resource (a number of memories). The memory resource can include a set of machine readable instructions (MRI) and the processing resource can be designed to carry out the set of instructions. The processing resource can carry out the set of instructions to define by at least one of a code scanner functionality (e.g., code scanners 342) and/or a configuration scanner functionality (e.g., configurations code scanners 344) dependencies between a plurality of feature flags in a process executable by the processing resource. The dependencies can be structured by a flag definition functionality (e.g., flag definitions reader 348) such that the plurality of feature flags are vertices and the dependencies between the plurality of feature flags are a number of edges (e.g., directed edges connecting a first feature flag with a number of other feature flags dependent from the first feature flag and/or that the first feature flag is dependent-on). In some examples, the dependencies can be structured as a directed acyclic graph (DAG). That is, the feature flag graph can be structured to prevent directed cycles that start at a particular vertex and follow a number of directed edges to loop back to the same vertex.

The structured dependencies can be stored (e.g., in the flag definitions storage 350) as accessible by either of a query functionality (e.g., query engine 352) and/or a GUI 354 (e.g., by the processing resource executing a set of instructions). In some examples, the feature management connector 357 can be used to access the structured dependencies (e.g., through either of the query engine 352 and/or the GUI 354) to perform a number of functions. Functions executable through the query functionality and/or the GUI 354 can (e.g., by the processing resource executing a set of instructions), for example, include to execute at least one of: mark a first feature flag as either of dependent from and/or dependent-on a number of other feature flags; determine either of existence of and/or activation status of the dependent from and the dependent-on feature flags; determine whether cyclic dependencies exist; and/or remove at least one of the dependencies (e.g., to resolve a number of cyclic dependencies, among other reasons); among other functions.

For example, a user, developer, client, etc., can mark a feature flag as having a number of feature flags depending therefrom and/or as being dependent-on one or more other feature flags. The system 340 can store these definitions and verify correctness of these definitions (e.g., verify lack of cyclic dependencies, verify that a dependent from and/or a dependent-on feature exists, etc). In a similar manner, the user can remove a dependency.

The feature flags graph (e.g., as shown at 210) can be made visible to the user, developer, client, etc., via, for example, the GUI 354 or its integration with the IDE plug-in 358 or via other accessibility to the feature flags system 340. This visibility can enable the user, developer, client, etc., to be presented with the consequences of defining, adding, and/or removing a feature flag dependency. A recorded feature flag graph can be queried for statuses of dependent from and/or dependent-on vertices and/or edges to verify that a feature flag status can be changed, under a given set of conditions. For example, when a first feature flag is activated (e.g., turned on) either manually or by some functionality of the feature flag system, a query can be made (e.g., through the query engine 352 and/or the GUI 354) to verify the feature flag state change is valid.

The feature flags graph can be traversed from a first flag vertex to vertices reachable via edges, a record of the reachable vertices can be returned, and the user, developer, client, etc., and/or a feature management system can verify that each of the corresponding feature flags and/or edges are activated or inactivated to enable feature operability and/or otherwise take corrective action (e.g., activate and/or inactivate a number of feature flags and/or edges or initiate notification that a number of feature flags are not switchable from one activation state to another activation state). When the first feature flag is inactivated, a query can be made to determine dependent-on feature flags and a determination can be made of the vertices that have a path to the first feature flag's corresponding vertex. This determination can be returned and can be used by the user, developer, client, etc. or the feature management system to verify that the corresponding flags are inactivated to appropriately disable feature operability and/or otherwise take corrective action (e.g., inactivate a number of feature flags and/or edges or initiate notification that a number of feature flags are not switchable from one activation state to another activation state).

Figure 4:
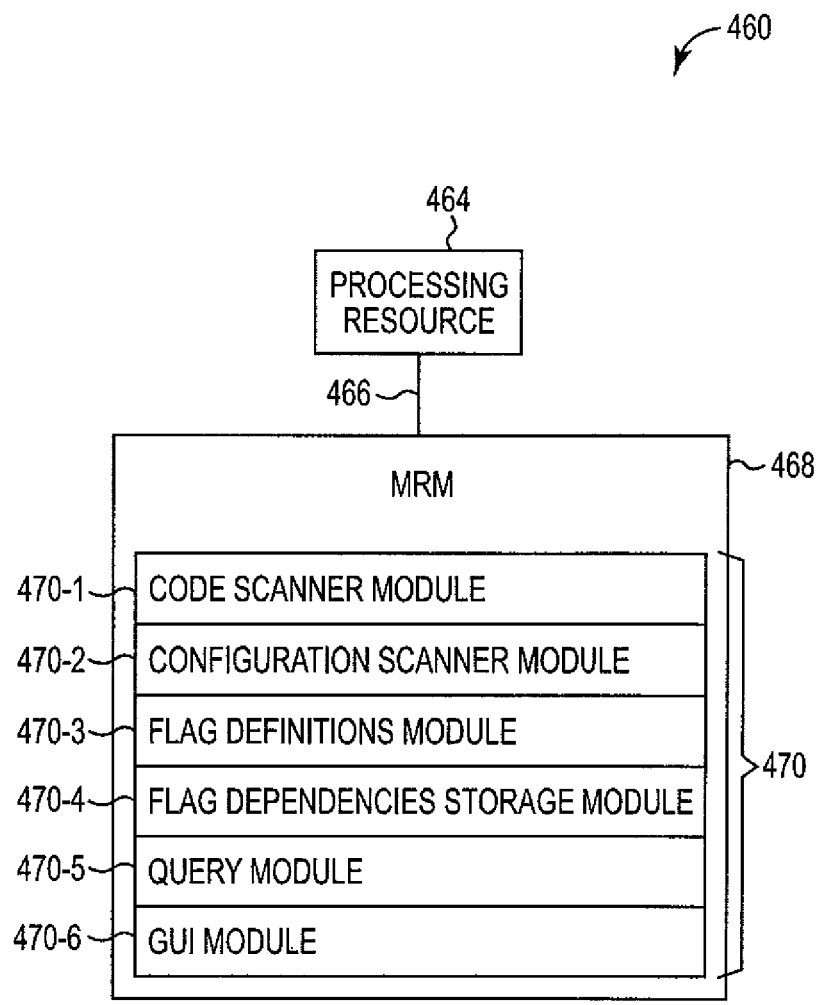
FIG. 4 illustrates a block diagram of an example computing system for handling dependencies between feature flags according to the present disclosure.

FIG. 4 illustrates a block diagram of an example computing system for handling dependencies between feature flags according to the present disclosure. The computing system 460 can utilize software, hardware, firmware, and/or logic for handling the dependencies between the feature flags, as described herein. The computing system 460 can be any combination of hardware and program instructions. The hardware, for example, can include a number of processing resources (e.g., processing resource 464), memory resources (e.g., MRM 468), and/or databases (e.g., flag dependencies storage 350, etc.), among other components. Program instructions (e.g., MRI stored in modules 470 on MRM 468) are executable by the processing resource 464 to perform the actions, functions, calculations, data manipulations and/or storage, etc., as described herein. The processing resource 464 can be in communication with the MRM 468 via a communication path 466.

The processing resource 464 can be in communication with a tangible non-transitory MRM 468 storing a set of MRI 470 executable by the processing resource 464, as described herein. The MRI 470 can also be stored in remote memory resources managed by a server (e.g., in a cloud) and/or can represent an installation package that can be downloaded, installed, and executed.

The processing resource 464 can execute MRI 470 that can be stored on an internal and/or external non-transitory MRM 468 (e.g., in a distributed computing environment, such as, in the cloud). The processing resource 464 can execute the MRI 470 to perform the various actions, functions, calculations, data manipulations and/or storage, etc., as described herein. The MRI 470 can include a number of modules (e.g., 470-1, 470-2, . . . , 470-6, among others) in the MRM 468. Any number and/or combination of modules can be stored in the MRM 468. The number of modules can include MRI that when executed by the processing resource 464 can instruct execution of the various actions, functions, calculations, data manipulations and/or storage, etc., as described herein. In some examples, the number of modules can include logic. As used herein, "logic" is an alternative and/or additional processing resource to execute the actions and/or functions, etc., described herein, which includes hardware (e.g., various forms of transistor logic, application specific integrated circuits (ASICs), etc.), as opposed to MRIs (e.g., software, firmware, etc.) stored in memory and executable by a processing resource.

A number of modules can be sub-modules of other modules. For example, a code scanner module 470-1 and configuration scanner module 470-2 can be sub-modules and/or can be contained within the same computing device. In another example, the number of modules can include individual modules on separate and distinct computing devices.

The code scanner module 470-1 can include MRI that when executed by the processing resource 464 can perform a number of functions. The code scanner module 470-1 can include instructions that when executed enable scanning, for example by the number of number of code scanners 342, of programming code (e.g., in a number of memory resources) for determination of feature flag dependency instructions. The configuration scanner module 470-2 can include MRI that when executed by the processing resource 464 can perform a number of functions, including determination of feature flag dependency instructions in saved configurations (e.g., of applications, features, etc.) by scanning with the number of configuration code scanners 344.

A flag definitions module 470-3 can include MRI that when executed by the processing resource 464 can perform a number of functions. The flag definitions module 470-3 can include instructions that when executed enable, for example by the flag definitions reader 348, overall determination of feature flag dependencies based upon input from at least one of the code scanner module 470-1 and/or the configuration scanner module 470-2. In some examples, such input also can be provided by the feature management connector 346.

A flag dependencies storage module 470-4 can include MRI that when executed by the processing resource 464 can perform a number of functions. The flag dependencies storage module 470-4 can include instructions that when executed enable, for example by the flag definitions storage 350 (e.g., memory, as described herein), feature flag dependencies to be accessibly stored, as described herein.

A query module 470-5 can include MRI that when executed by the processing resource 464 can perform a number of functions. The query module 470-5 can include instructions that when executed enable, for example through the query engine 352, input of instructions, queries, etc., (e.g., by the user, developer, client, feature flag management system, etc.) regarding handling of the dependencies between the feature flags, as described herein. A GUI module 470-6 can include MRI that when executed by the processing resource 464 can perform a number of functions. The GUI module 470-6 can include instructions that when executed enable, for example through the GUI 354, input of instructions, queries, etc., (e.g., by the user, developer, client, feature flag management system, etc.) regarding handling of the dependencies between the feature flags, as described herein.

In various examples, the MRM 468 can include a number of other modules that include MRI that, when executed by the processing resource 464, can perform a number of functions. For example, a CLI module can include MRI that when executed by the processing resource 464 can enable, for example, direct user interaction via the CLI 356, in order to perform a number of functions via the instructions stored in the query module 470-5 and/or the GUI 470-6. Similarly, a feature management connector module can include MRI that when executed by the processing resource 464 can enable, for example via the feature management connector 357, management of a number of functions via the instructions stored in the query module 470-5 and/or the GUI module 470-6. An IDE plug-in module can include MRI that when executed by the processing resource 464 can enable, for example, functionality of an IDE plug-in 358.

In various examples, any of the MRI 470 included in the number of modules (e.g., 470-1, 470-2, . . . , 470-6, among others) can be stored (e.g., in software, firmware, and/or hardware) individually and/or redundantly in the same and/or separate locations. Separately stored MRI 470 can be functionally interfaced with the processing resource 464 (e.g., via communication path 466). For example, the flag dependencies storage module 470-4 may be stored and/or executed in one computing system and the GUI module 470-6 may be stored and/or executed in another computing system, among many other examples.

As described herein, plurality of storage volumes can include volatile and/or non-volatile storage (e.g., memory). Volatile storage can include storage that depends upon power to store information, such as various types of dynamic random access memory (DRAM), among others. Non-volatile storage can include storage that does not depend upon power to store information. Examples of non-volatile storage can include solid state media such as flash memory, electrically erasable programmable read-only memory (EEPROM), phase change random access memory (PCRAM), magnetic storage such as a hard disk, tape drives, floppy disk, and/or tape storage, optical discs, digital versatile discs (DVD), Blu-ray discs (BD), compact discs (CD), and/or a solid state drive (SSD), etc., as well as other types of machine readable media.

The figures herein follow a numbering convention in which the first digit or digits in the drawing correspond to the figure number and the remaining digits identify an element or component in the drawing. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

It is to be understood that the descriptions presented herein have been made in an illustrative manner and not a restrictive manner. Although specific examples systems, machine readable media, methods and instructions, for example, for dynamically handling dependencies between feature flags have been illustrated and described herein, other equivalent component arrangements, instructions, and/or device logic can be substituted for the specific examples presented herein without departing from the spirit and scope of the present disclosure.

The specification examples provide a description of the application and use of the systems, machine readable media, methods, and instructions of the present disclosure. Since many examples can be formulated without departing from the spirit and scope of the systems, machine readable media, methods, and instructions described in the present disclosure, this specification sets forth some of the many possible example configurations and implementations.

What is claimed:

1. A method of handling dependencies between feature flags, comprising:
defining, by a processing resource executing instructions, dependencies between a plurality of feature flags in a process executable by the processing resource; and
enforcing, by the processing resource executing instructions, the dependencies during activation of a first feature by a determination of validity of utilization of a feature flag as a switch for a second feature.

2. The method of claim 1, wherein enforcing comprises determining dependencies between a first feature flag and a second feature flag to reduce a probability that the activation of the first feature results in a reduction of process functionality.

3. The method of claim 1, comprising defining and enforcing the dependencies in association with either of continuous delivery and continuous integration of code for the process.

4. The method of claim 1, wherein defining comprises defining a cyclic dependency between the plurality of feature flags and activating a notification that results in either of removing at least one dependency that causes the cyclic dependency and applying a consolidated feature flag to the plurality of feature flags of the cyclic dependency.

5. The method of claim 1, comprising presenting the dependencies on a graphic user interface and enforcing the dependencies through the graphic user interface.

6. A non-transitory machine readable medium storing a set of instructions that, when executed, cause a processing resource to:
define, in a feature flags graph, dependencies between a plurality of feature flags in a process executable by the processing resource, wherein the feature flags graph comprises the plurality of feature flags as vertices and the dependencies between the plurality of feature flags as a number of edges;
determine operability of the process via the feature flags graph when the process utilizes a first feature flag as a switch; and
determine, based upon the dependencies in the feature flags graph, whether the first feature flag is utilizable as the switch;
determine, when the first feature flag is to be activated or inactivated, a validity of a change in a feature flag status based upon a determination of dependent and dependent-on vertices by traversing from a vertex corresponding to the first feature flag.

7. The non-transitory machine readable medium of claim 6, wherein the set of instructions, when executed, cause the processing resource to determine, when the first feature flag is to be activated, the validity of the change in the feature flag status.

8. The non-transitory machine readable medium of claim 7, wherein the set of instructions, when executed, cause the processing resource to determine whether the dependent and dependent-on vertices have feature flags that are activated.

9. The non-transitory machine readable medium of claim 6, wherein the set of instructions, when executed, cause the processing resource to determine, when the first feature flag is to be inactivated, the validity of the change in the feature flag status.

10. The non-transitory machine readable medium of claim 9, wherein the set of instructions, when executed, cause the processing resource to determine whether the dependent and dependent-on vertices have feature flags that are inactivated.

11. The non-transitory machine readable medium of claim 6, wherein the set of instructions, when executed, cause the processing resource to determine whether an edge is traversable based upon satisfaction of at least one input condition, wherein the at least one input condition is selected from a set that includes environment conditions and user conditions.

12. A system to handle dependencies between feature flags, the system comprising a processing resource in communication with a memory resource, wherein the memory resource includes a set of instructions and wherein the processing resource is designed to carry out the set of instructions to:
define by at least one of a code scanner functionality and a configuration scanner functionality dependencies between a plurality of feature flags in a process executable by the processing resource;
structure the dependencies by a flag definition functionality such that the plurality of feature flags are vertices, the dependencies between the plurality of feature flags are a number of edges, and the structuring allows, when a first feature flag of the plurality of feature flags is to be activated or inactivated, a determination of a validity of a change in a feature flag status based upon a determination of dependent and dependent-on vertices by traversing from a vertex corresponding to the first feature flag; and
store the structured dependencies as accessible by either of a query functionality and a graphic user interface.

13. The system of claim 12, wherein the processing resource is designed to carry out the set of instructions to structure the dependencies as a directed acyclic graph.

14. The system of claim 12, wherein the processing resource is designed to carry out the set of instructions to execute at least one of:
mark a first feature flag as either of dependent from and dependent-on a number of other feature flags;
determine either of existence and activation status of the dependent from and the dependent-on feature flags;
determine whether cyclic dependencies exist; and
remove at least one of the dependencies.

15. The system of claim 12, wherein the processing resource determines whether the dependent and dependent-on vertices have feature flags that are activated.

16. The system of claim 12, wherein the processing resource determines whether the dependent and dependent-on vertices have feature flags that are inactivated.

17. The system of claim 12, wherein the processing resource enforces the dependencies through the graphic user interface.

18. The system of claim 12, wherein the processing resource determines whether an edge of the number of edges is traversable based upon satisfaction of at least one input condition, wherein the at least one input condition is selected from a set that includes environment conditions and user conditions.

19. The system of claim 12, wherein the dependencies comprise cyclic dependencies.

* * * * *